Jan. 19, 1971 R. R. AUSTIN 3,556,640
INTERFERENCE FILTER WITH DIELECTRIC TUNING LAYERS
Filed March 1, 1968
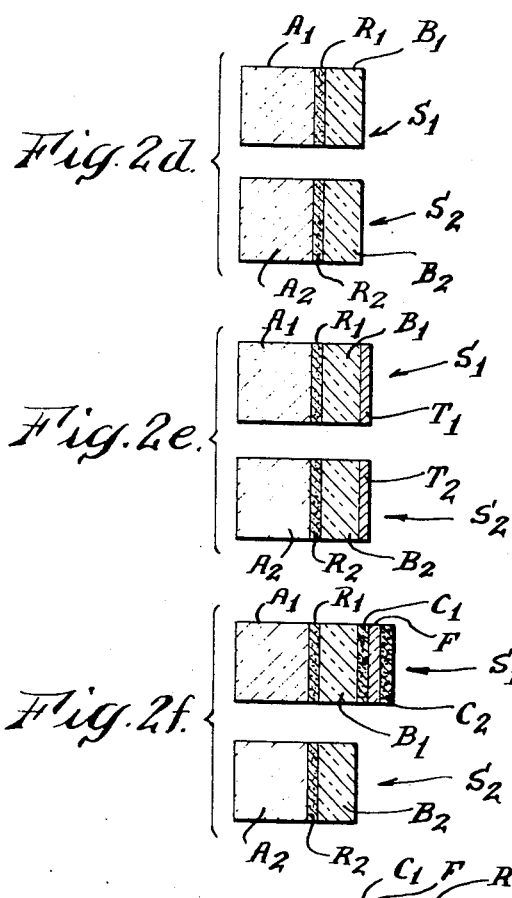
Fig. 2a.
Fig. 2b.
Fig. 2c.
Fig. 2d.
Fig. 2e.
Fig. 2f.
Fig. 2g.
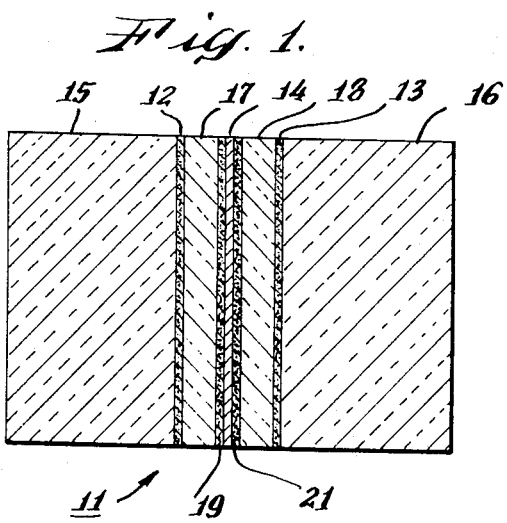
Fig. 1.
INVENTOR.
Robert R. Austin
BY
Irving M. Kriegsman
ATTORNEY.

United States Patent Office 3,556,640
Patented Jan. 19, 1971

3,556,640
INTERFERENCE FILTER WITH DIELECTRIC TUNING LAYERS
Robert R. Austin, Ridgefield, Conn., assignor to The Perkin-Elmer Corporation, Norwalk, Conn., a corporation of New York
Filed Mar. 1, 1968, Ser. No. 709,661
Int. Cl. G02b 1/10
U.S. Cl. 350—164                               5 Claims

ABSTRACT OF THE DISCLOSURE

A three reflector interference filter in which the two spacer elements used to separate the reflectors are made of solid glass. The two outer reflectors are multilayer dielectric films and are formed on separate substrates. The outer ends of the two spacer elements are optically contacted to the substrates. The inner ends of the spacer elements are optically contacted to each other. The inner reflector, which is a metal film is formed on the inner end of one of the spacers.

---

This invention relates to light filters. More particularly this invention relates to interference type light filters.

Interference filters are well known and widely used devices for passing selected radiation wavelengths while simultaneously rejecting undesirable wavelengths. Although many different filters are governed by interference phenomena, the term "interference filter" is generally used to describe a Fabry-Perot type of interference filter. Both single and double versions of the Fabry-Perot filter are old. The single Fabry-Perot filter is made up essentially of two parallel spaced apart reflectors. The double Fabry-Perot filter is made up essentially of two single Fabry-Perot filters arranged in series so as to form three spaced apart reflectors.

When white light is passed through an interference filter and subsequently dispersed a banded spectrum is seen. The location of the transmission bands is dependent on the distance between the reflectors. As the distance is made larger, the transmision bands "move" toward the higher end of the spectrum. Also, as the distance is made larger, the width of the transmission bands and the distance between adjacent transmission bands decreases. Changes in the distance between reflectors as small as a fraction of the design wavelength will result in changes of several Angstroms in the location of the transmission bands. Thus, the distance between reflectors is extremely critical.

Hitherto, single Fabry-Perot filters have been made, according to one technique, by forming the two reflectors in separate substrates and then using spacer pins or other mechanical means to hold the substrates at the desired distance. One disadvantage of this arrangement is that the assembly is extremely difficult to initially align and then maintain in alignment. According to another technique, both reflectors are formed on the same side of a single substrate and separated from each other by a spacer layer of dielectric material. According to a third technique, both reflectors are formed on opposite sides of a thin sheet of naturally occurring mica. A disadvantage of these latter two techniques is that they are only good for obtaining reflector separations of up to about 10 microns.

Double Fabry-Perot filters have been made using layers of dielectric materials for the reflectors and spacers, with all the layers being formed on the same side of a single substrate. As in the case of the single Fabry-Perot filter the thickness of the spacer layers is limited to about 10 microns. It has also been suggested that a double Fabry-Perot filter might be made by cementing together two single Fabry-Perot filters, each comprising a substrate coated on one side with two metal films and a dielectric spacer layer. However, this technique is also only good for obtaining distances between reflectors of up to about 10 microns.

The following is a list of some of the published materials on interference filters.

(1) U.S. Pat. 3,039,362,
(2) U.S. Pat. 3,051,208,
(3) Optical Properties of Thin Solid Films, O. S. Heavens, 1965, Dover Publications, Inc., New York, pages 227–231,
(4) Physics of Thin Films, volume 2, G. Hass and R. E. Thun, 1964, Academic Press.

It is an object of this invention to provide a new and improved interference filter and method of making the same.

It is another object of this invention to provide a new and improved double Fabry-Perot type interference filter and method of making the same.

It is still another object of this invention to provide an interference filter in which the transmission bands are substantially rectangular shaped and have a half band width as small as about 0.1 A.

It is another object of this invention to provide a double Fabry-Perot type interference filter that is extremely rigid and in which the reflectors can be separated by distances up to as large as 1,000 microns and more.

It is still another object of this invention to provide a double Fabry-Perot type interference filter having a transmission band at precisely the required wavelength.

The above and other objects are achieved by constructing a filter according to this invention.

Basically, the filter is an improved version of the three reflector, double Fabry-Perot type filter. The two outer reflectors are made of multilayers of dielectric materials and the common inner reflector is made of a metal film. The spacers are made of solid glass. Tuning layers of dielectric material are used to increase, if necessary, the thickness of the spacers so that they are precisely the size needed to produce a transmission band at a particular wavelength. The outer reflectors are formed on separate substrates whereas the inner reflector is formed on one of the spacers. Optical contacting is used to connect the substrates to the spacers and the spacers to each other.

The filter is assembled in the following manner. First the outer reflectors are formed on separate substrates. An oversized glass spacer is then connected to each substrate. The spacers are then machined down to approximately the correct thickness. The error in the thickness of each spacer is then determined. The inner reflector and two tuning layers, one to correct for the error, if any, in the thickness of each spacer, are then deposited in order onto one of the spacers. The two spacers are then connected to each other.

Other features will become apparent and the invention will be better understood on reading the following detailed description when taken in conjunction with the accompanying drawings in which like reference numerals represent like parts and wherein:

FIG. 1 is a section view, greatly enlarged of a filter constructed according to this invention, and FIG. 2 is a series of section views showing how the filter is made and assembled.

Referring now to FIG. 1 there is shown a filter 11 constructed according to this invention. The filter 11 includes two outer reflectors 12 and 13 and an inner reflector 14. Outer reflector 12 and 13 are multilayer dielectric coatings and are preferably identical. For simplicity, reflectors 12 and 13 are shown in FIG. 1 as single coatings. Reflector 14 is a single metallic film. One of the outer reflectors 12 is formed on the rear end of a supporting substrate 15. The other outer reflector 13 is formed on the front end of a supporting substrate 16. The two substrates 15 and 16 are made of any type of glass transparent to the light being transmitted. The filter 11 further includes two spacer element 17 and 18 which are made of solid glass and preferably the same type of glass as used for the substrates 15 and 16. The front end of one of the spacer element 17 is connected by optical contacting to the coated rear end of supporting substrate 15. The rear end of the other spacer element 18 is connected by optical contacting to the coated front end of supporting substrate 16. The filter 11 may further include two tuning or correcting layers 19 and 21 made of dielectric material and having approximately the same index of refraction as the glass used for the spacer elements 17 and 18. The two tuning layers 19 and 21 and the inner reflector 14 are formed on the rear end of spacer element 17, with the two tuning layers 19 and 21 being on either side of the reflector 14. The rear end of spacer elements 17 is connected by optical contacting to the front end of spacer element 18.

Thus, as can be seen, reflectors 12 and 14 are separated by a distance equal to the combined thickness of spacer 17 and tuning layer 19. Similarly, reflectors 13 and 14 are separated by a distance equal to the combined thickness of spacer 18 and tuning layer 21.

Referring now to FIG. 2, there is shown a series of section views illustrating how the filter is constructed.

First, an optically flat and plane parallel solid body of glass A is selected for use in making the two substrates. Another optically flat and plane parallel solid body of glass B, which may be the same type as glass A, is selected for use in making the two spacers. The thickness of glass B is at least equal to the thickness needed for the spacers. A high reflection multilayer dielectric coating R is then deposited, such as by evaporation, on to the rear end of glass A (FIG. 2(a)).

The front end of glass B is then connected by optical contacting to the coated rear end of glass A (FIG. 2(b)).

Material is then removed from the rear end of glass B, such as by machining and/or polishing etc., so that its thickness is approximately equal to the thickness required for the two spacers (FIG. 2(c)).

The assembly of glass A, coating R and glass B is then cut so as to form two smaller assemblies $S_1$ and $S_2$; assembly $S_1$ being made up of glass $A_1$, coating $R_1$ and glass $B_1$ and assembly $S_2$ being made up of glass $A_2$, coating $R_2$ and glass (FIG. 2(d)).

The thickness of glass $B_1$ is, of course, equal to the thickness of glass $B_2$. If a filter is required in which the two spacers have vastly different thicknesses, then the two smaller assemblies are formed before the material is removed. In this way each spacer can be sized separately.

A temporary metal film $T_1$ is then deposited, such as by evaporation on to the rear end of spacer $B_1$. Another temporary metal film $T_2$ is deposited on to the rear end of spacer $B_2$. Thus, each assembly $S_1$ and $S_2$ is, in effect, a single Fabry-Perot filter (FIG. 2(e)).

Using techniques well known in the art, the two assemblies $S_1$ and $S_2$ are tested separately to see where the transmission bands for each are located. In assembly $S_1$ the location of the transmission bands is dependent on the thickness of glass spacer $B_1$ and in assembly $S_2$ the location of the transmission bands is dependent on the thickness of glass spacer $B_2$. Once this is determined, the amount, if any, by which each spacer must be increased in thickness to provide the reflector separation necessary to produce a passband at the exact desired wavelength can be readily calculated.

For example, assume a filter is required having a passband at 5,253 A. and that when each assembly $S_1$ and $S_2$ is tested separately passbands occur at 5,243 A. and 5,258 A. The distance between these two passbands (i.e., 15 A.) is thus equivalent to a space of $\lambda/2$ optical thickness where $$\lambda = \frac{5243 + 5258}{2}$$

or 5,250.5 A. A 10 A. shift (the shift necessary to "move" the passband at 5,243 A. up to 5,253 A.) can thus be achieved by increasing the thickness of the spacer by $\lambda/2$ at 10/15 of 5,250.5 A. or $\lambda/2$ at 3,505 A.

The temporary films $T_1$ and $T_2$ are then removed.

Two tuning lays $C_1$ and $C_2$ of dielectric material and a metal film F are then deposited, such as by evaporation on to the rear end of spacer $B_1$ (FIG. 2(f)). The index of refraction of the tuning layers $C_1$ and $C_2$ is approximately equal to the index of refraction of the spacers $B_1$ and $B_2$. The thickness of each tuning layer $C_1$ and $C_2$ is dependent on the error in thickness of each spacer element $B_1$ and $B_2$ respectively. Tuning layer $C_1$ is intended to correct for the error in spacer $B_1$ and tuning layer $C_2$ is intended to correct for the error in spacer $B_2$ (FIG. 2(f)).

Finally, the rear end of spacer $B_2$ of assembly $S_2$ is connected by optical contacting to the coated rear end of spacer $B_1$ of assembly $S_1$ (FIG. 2(g)).

As can be seen tuning layer $C_2$ is deposited over metal film F rather than on the rear end of glass spacer $B_2$. In this manner, the difficulty in optically contacting a surface having a dielectric layer to a surface having a metal film is avoided.

A filter may be constructed according to this invention using fused silica having an index of refraction of 1.46 for the substrates, multilayer dielectric coatings having a reflectivity of 90% for the two outer reflectors, a silver film having a thickness of 700 A. for the inner reflector and fused silica having a thickness of 80 microns and an index of refraction for the spacers. Such a filter will have a transmission band having a width of about 1.5 A. and a separation between transmission bands of about 15 A. If one spacer is made about 80 microns and the other spacer about 700 microns. The transmission bandwidth will be about 0.1 A. and the separation between transmission bands about 30 A.

Obviously, many modifications and variations of the present invention are possible in light of the above teachings. It is therefore to be understood that within the scope of the appended claims, the invention may be practiced otherwise than as specifically described.

What is claimed is:

1. An interference filter comprising:
   a first substrate having a reflective coating on its rear end;
   a first spacer element of solid glass connected at its front end to the reflective coating on the rear end of the first substrate and having a reflective coating on its rear end;
   a tuning layer of dielectric material having an index of refraction approximately equal to that of the first spacer coated on the rear end thereof between the latter end and the reflective coating thereon for adjusting the thickness of the first spacer to produce a passband of a desired wavelength;
   a second spacer element of solid glass;
   a second substrate having a reflective coating on its front end and connected to the rear end of the second spacer element; and
   a tuning layer of dielectric material having an index of refraction approximately equal to that of the second spacer coated on the rearward side of the reflective coating on the rear end of the first spacer for supplementing the thickness of the second spacer to provide a total thickness thereof to produce a passband of a desired wavelength, the front of the second spacer being connected to the latter tuning layer by optical contacting.

2. The filter according to claim 1 and wherein the reflective coatings on the substrates are multilayer dielectric films.

3. The filter according to claim 2 and wherein the reflective coating on the spacer element is a metal film.

4. The filter according to claim 1 and wherein the two spacer elements have the same thickness.

5. The filter according to claim 1 and wherein the two spacer elements have different thicknesses.

References Cited

UNITED STATES PATENTS

| | | | |
|---|---|---|---|
| 3,134,837 | 5/1964 | Kislink et al. | 350—163UX |
| 3,466,120 | 9/1969 | Herriott et al. | 350—163X |

OTHER REFERENCES

Baumeister, P. W., "Multilayer Filters," vol. 7, Institute of Optics, College of Engr. & Applied Science, The Univ. of Rochester, Rochester, N.Y. Summer, 1963. Received April 1964. Found in Group 259, pp. 20-79, 20-81.

Rank et al., The Compound Fabry—Perot Interferometer 41 JOSA 351–353. QC 350 06. Found in Group 259. May 1951.

DAVID SCHONBERG, Primary Examiner

T. H. KUSMER, Assistant Examiner

U.S. Cl. X.R

117—33.3